United States Patent
Lojko et al.

(10) Patent No.: US 11,673,513 B2
(45) Date of Patent: Jun. 13, 2023

(54) VEHICLE AND ROOF CONSTRUCTION INCLUDING A DISPLAY DEVICE FOR USE THEREIN

(71) Applicant: Inalfa Roof Systems Group B.V., Oostrum (NL)

(72) Inventors: Sergej Sergeevic Lojko, Lottum (NL); Thomas Anton Martijnszoon Albers, Venray (NL); Suyanto Teri Wahiyu Ten-Jet-Foei, Nijmegen (NL)

(73) Assignee: INALFA ROOF SYSTEMS GROUP B.V, Oostrum (NL)

( * ) Notice: Subject to any disclaimer, the term of this patent is extended or adjusted under 35 U.S.C. 154(b) by 241 days.

(21) Appl. No.: 17/135,039

(22) Filed: Dec. 28, 2020

(65) Prior Publication Data
US 2021/0197731 A1  Jul. 1, 2021

(30) Foreign Application Priority Data

Dec. 30, 2019 (EP) .................... 19220029

(51) Int. Cl.
*B60R 11/02* (2006.01)
*B60R 11/00* (2006.01)
*B60R 13/02* (2006.01)

(52) U.S. Cl.
CPC ... *B60R 11/0235* (2013.01); *B60R 2011/0028* (2013.01); *B60R 2011/0084* (2013.01); *B60R 2011/0085* (2013.01); *B60R 2011/0092* (2013.01)

(58) Field of Classification Search
None
See application file for complete search history.

(56) References Cited

U.S. PATENT DOCUMENTS

| 2015/0138043 A1* | 5/2015 | Rawlinson | G06F 3/1454 |
| 2017/0158034 A1* | 6/2017 | Nellen | B60J 7/0015 |
| 2020/0070736 A1* | 3/2020 | Kim | B60K 35/00 |

FOREIGN PATENT DOCUMENTS

| CN | 108773329 A | 11/2018 |
| EP | 2873563 A1 | 5/2015 |
| KR | 20190140806 A | 12/2019 |
| WO | 2020020763 A1 | 1/2020 |

OTHER PUBLICATIONS

European Search Report for corresponding European Patent Application No. 19220029.3, dated Apr. 14, 2020.

* cited by examiner

*Primary Examiner* — Christopher Braniff
(74) *Attorney, Agent, or Firm* — Steven M. Koehler; Westman, Champlin & Koehler, P.A.

(57) ABSTRACT

A vehicle includes a roof construction comprising at least one semi-transparent panel fitted in an opening in the fixed roof of the vehicle. The panel is connected to a stationary frame. A headliner on the interior side of the fixed roof is provided for hiding the fixed roof and stationary frame from view. At least one display device is capable of showing images from its display screen to occupants in the vehicle. A drive system is provided for moving the display screen at least into a storage position and into an operational position in which the display screen is visible for occupants in an interior space of the vehicle. The display screen, in its storage position, is moved into a cavity above the headliner and is thus hidden from view and protected by the headliner.

20 Claims, 14 Drawing Sheets

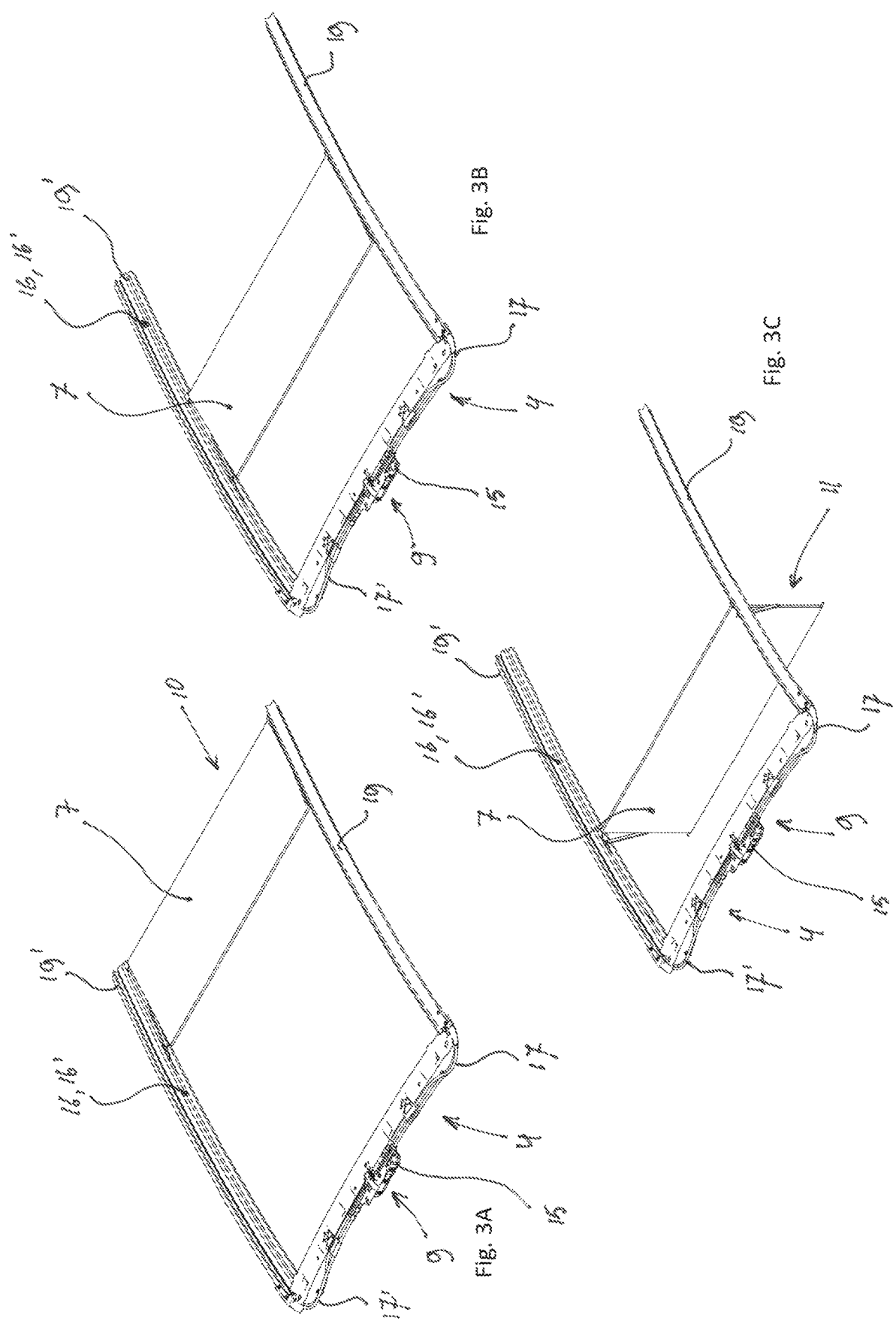

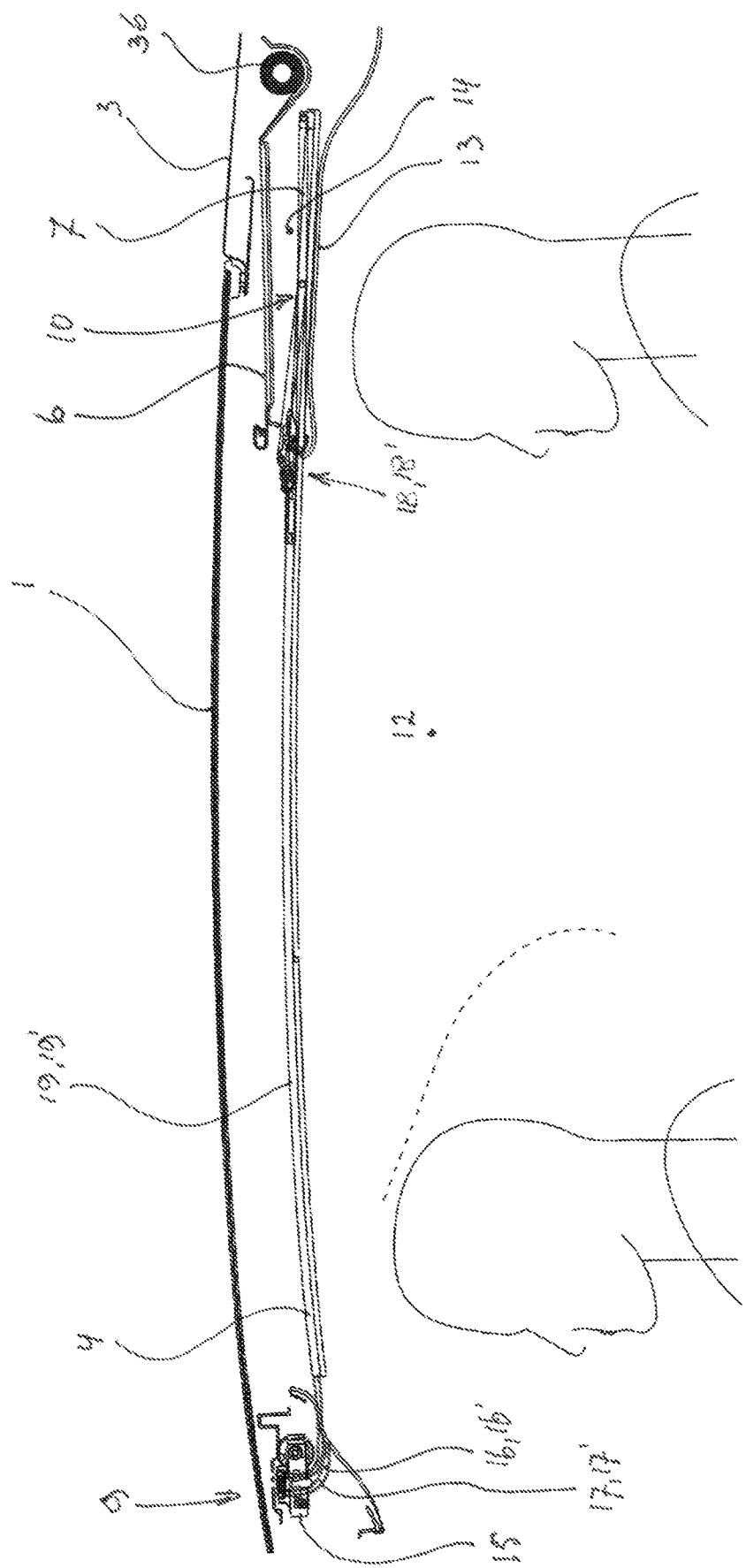

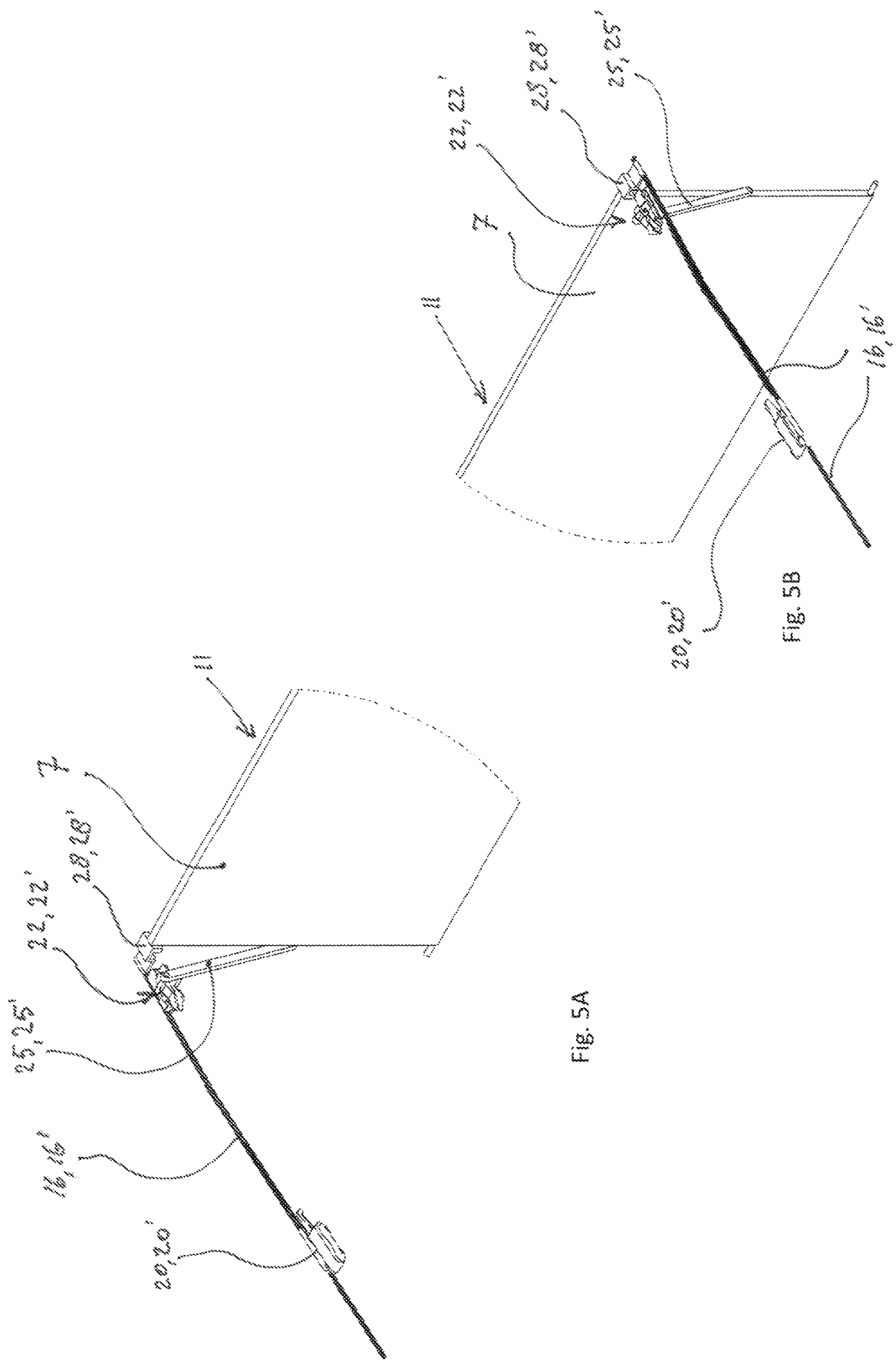

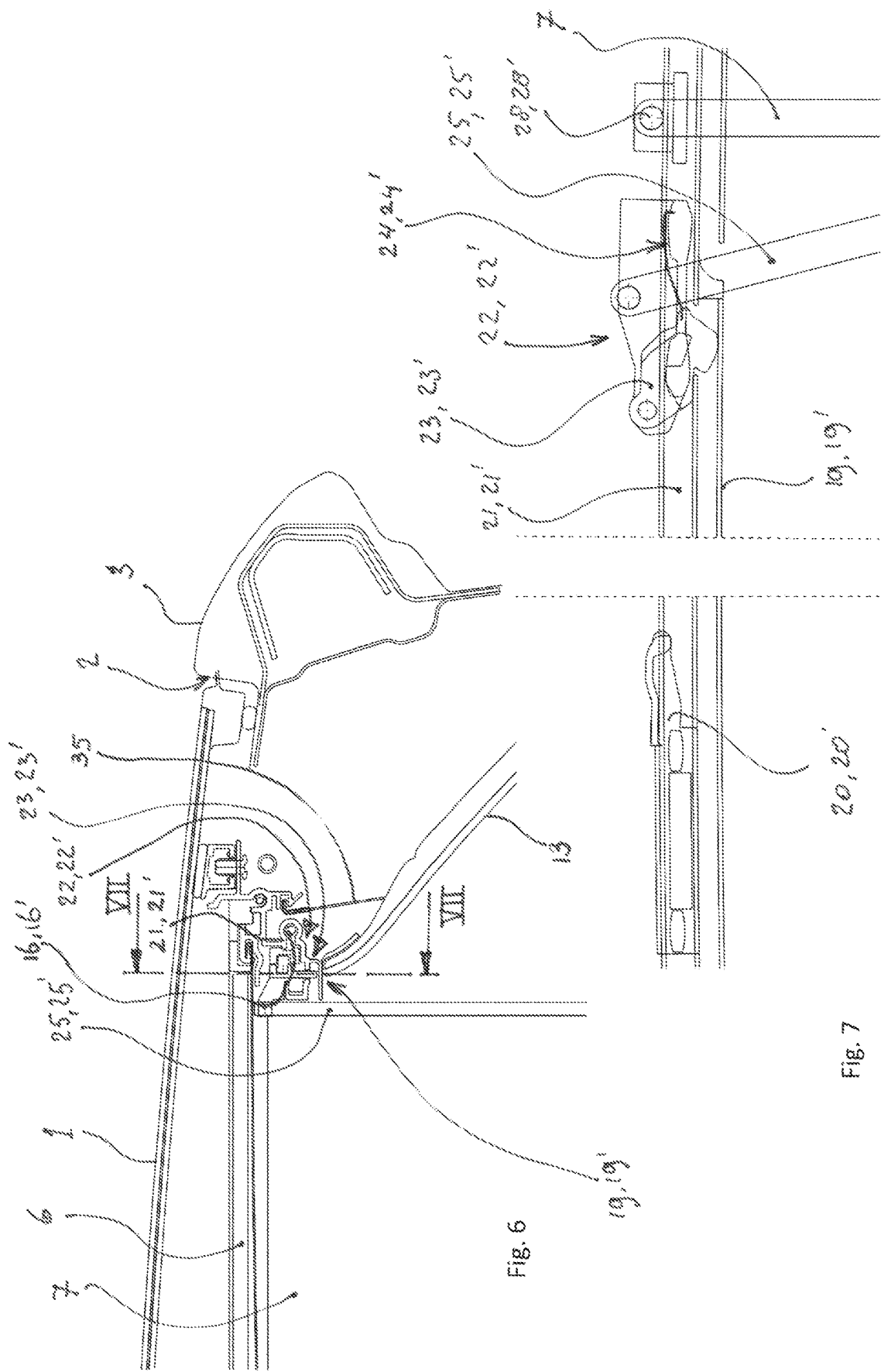

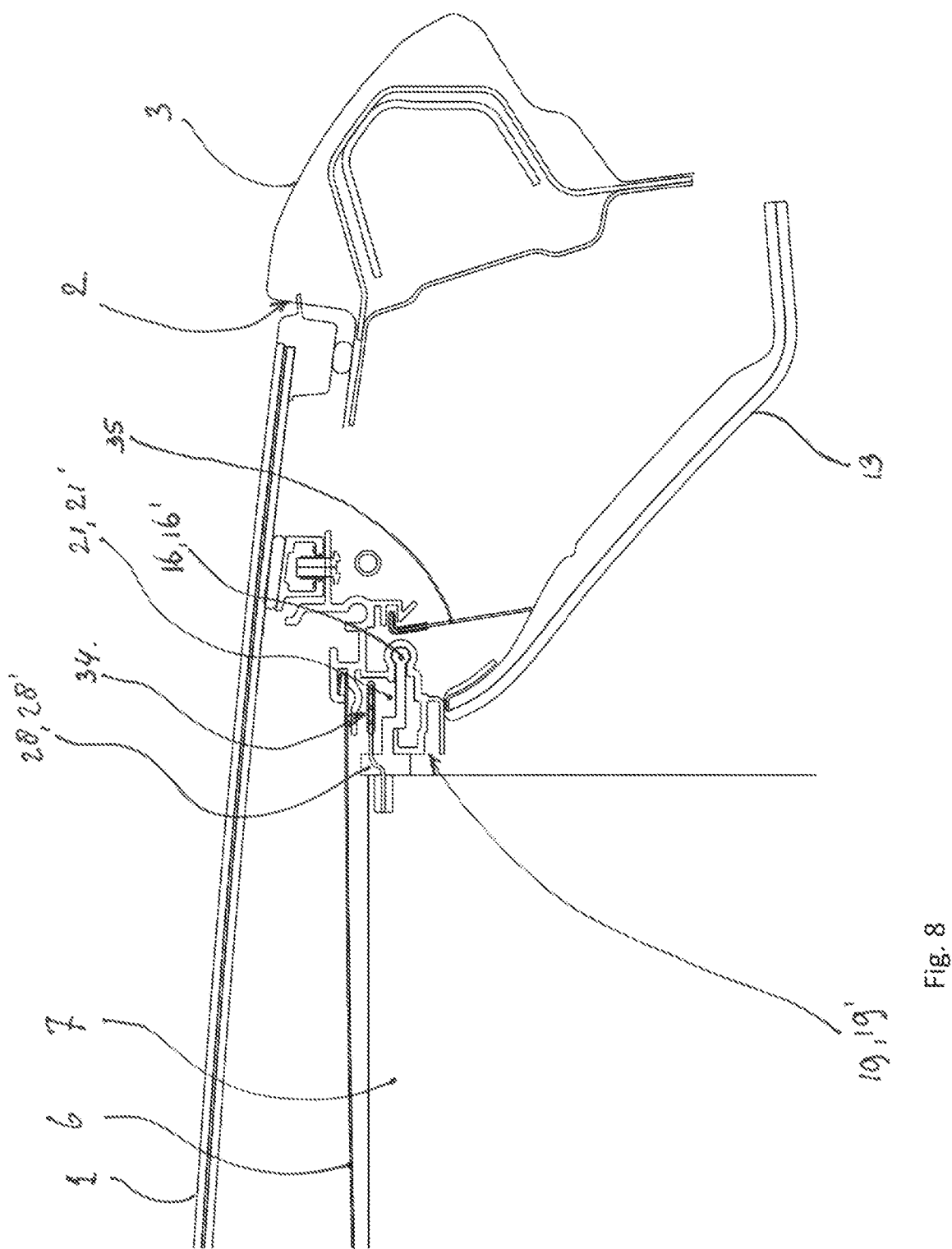

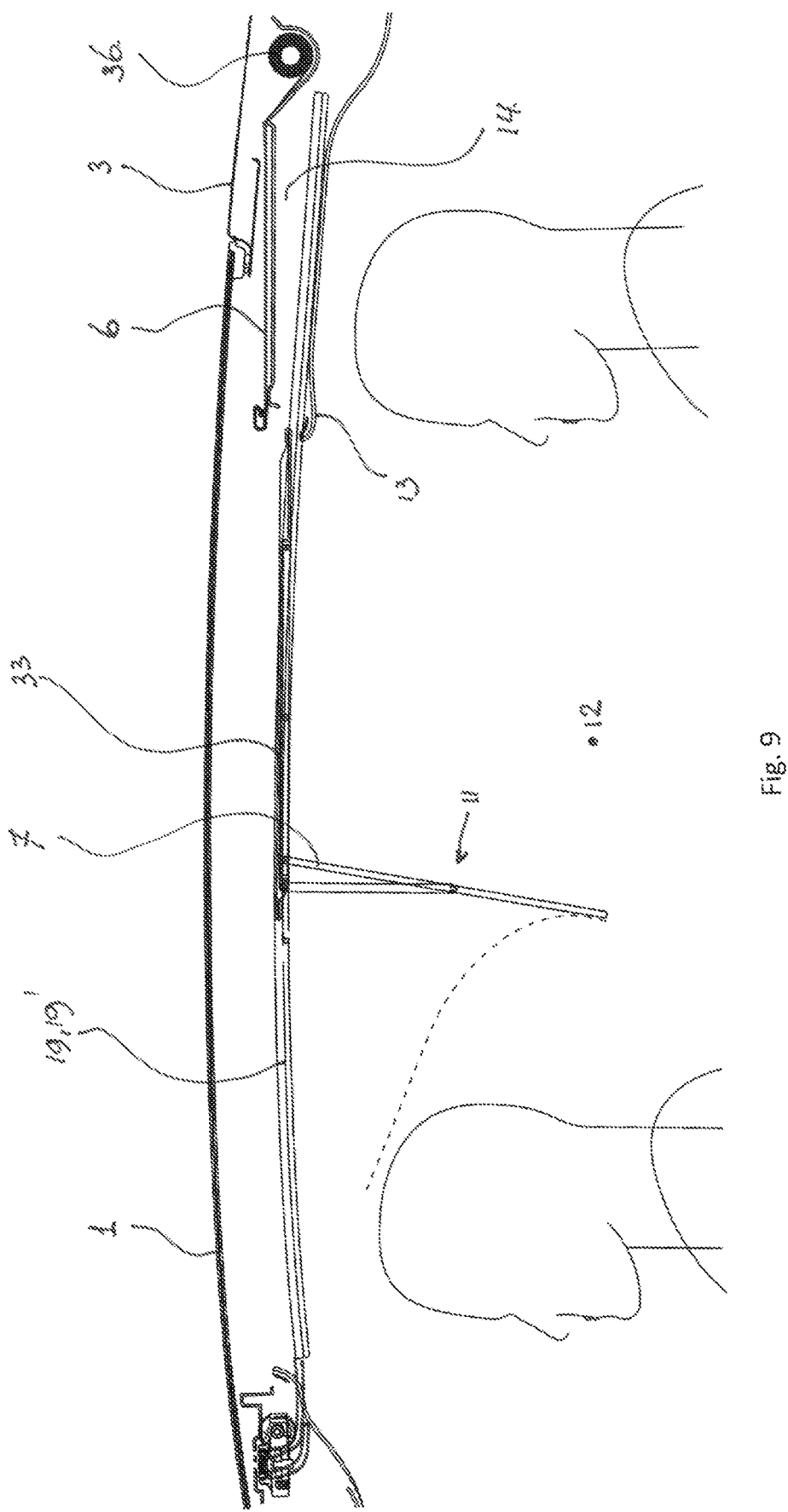

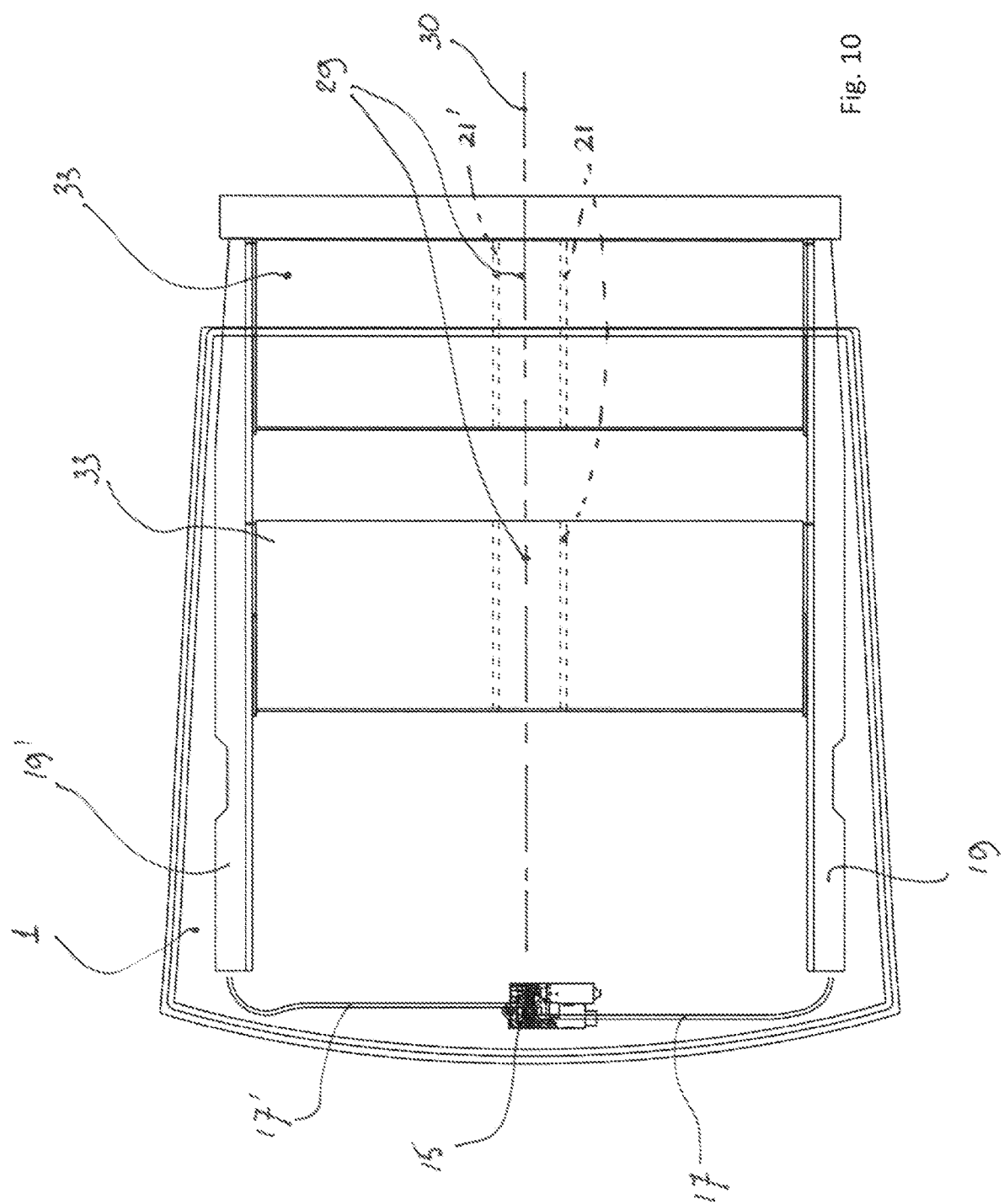

VEHICLE AND ROOF CONSTRUCTION INCLUDING A DISPLAY DEVICE FOR USE THEREIN

BACKGROUND

The discussion below is merely provided for general background information and is not intended to be used as an aid in determining the scope of the claimed subject matter.

Display devices in vehicles are known from the prior art for instance in which display devices are attached to the interior side of the roof of a vehicle and which displays can easily be pivoted from a storage position into an operational position in which the display screen is readable to the occupants of the vehicle.

In case a vehicle is equipped with a roof construction having a fixed semi-transparent panel or a roof construction having a semi-transparent panel which is openable, the use of a display devices becomes more complicated, especially in case when the roof construction is equipped with more than one semi-transparent panel. In case of a multi panel roof construction, a larger area of the fixed roof of the vehicle is covered by these panels. In such case the use of display devices attached to the roof is difficult because of the presence of the display devices in the storage positions which would obstruct the view through the semi-transparent panels and the amount of light that may reach the interior. Also such display devices in their storage positions would influence other functionalities of the roof construction, for instance interfere or completely cover the semi-transparent panels from the interior side, or obstruct ventilation in case of an opened panel.

From a customer point of view there is a tendency to enlarge the size of the display devices such that the occupants can view larger images. Such larger display devices are not suitable to be simply rotated downwards from a stored position into an operational position, because the rotating display device will move close towards or even may be within the facial region of the occupant. To avoid this, the display device may be moved from a stored position into an operational position in a different way. In that case, the display device is positioned overhead in a horizontal plane with the display screen facing downwards, the display device may be moved horizontally to the front and at the same time may be rotated downwards whereby the front part of the display device rotates downward first towards the operational position. In this way a protrusion of the display device in the facial region of the occupant is avoided. Nevertheless also with this improved movement of the display device still the display device interferes with the functions of the roof construction. Next to this, when the display screen is facing downwards when the display screen is in its stored position, there may be a risk of damaging the display screen for instance by objects being moved in the interior. And when the display device is visible in the interior of the vehicle in their stored position, there may be an incentive for theft of the display device.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention provides for a vehicle having a roof construction to be used in combination with a display device which can be used independent from the functions of the roof construction and which protects the display device against damages and theft.

A vehicle includes a roof construction comprising at least one semi-transparent panel fitted in an opening in the fixed roof of the vehicle. The panel is connected to a stationary frame. A headliner on the interior side of the fixed roof is provided for hiding the fixed roof and stationary frame from view. At least one display device is capable of showing images from its display screen to occupants in the vehicle. A drive system is provided for moving the display screen at least into a storage position and into an operational position in which the display screen is visible for occupants in an interior space of the vehicle. The display screen, in its storage position, is moved into a cavity above the headliner and is thus hidden from view and protected by the headliner.

Due to the position of the display device above the headliner when in its storage position, it is protected against damage which may be caused by moving objects in the interior space. As the headliner also hides the display device from view, it does not attract the attention of thieves.

The headliner may surround the circumventing edge of the at least one semi-transparent panel and leaves an opening to enable the display device to enter and exit the cavity. This exit and entry opening may be According to another aspect of the invention, to establish the operational position, the display device is moved by the drive system out of its storage position in a substantially horizontal movement and is rotated along a substantially horizontal axis into an operational position whereby the front end of the display device rotates from the substantially horizontal moving plane downwardly and the rearward end of the display device substantially stays in the substantially horizontal moving plane. The movement of the display device is made in such a way that the occupants are not bothered in the facial region by the display device moving from the stored position towards the operational position.

According to another aspect, the drive system comprises at least one drive motor, capable of driving at least one pair of flexible drive cables, said drive cables guided in at least a pair of guide tubes, said drive cables being connected to at least a pair of mechanism devices, slidably guided to at least one pair of guides, said guides being attached to the stationary frame. In this embodiment the movement of the display device is done by a drive system, which is driven by an electric drive motor. The electric drive motor is electronically controlled by means of a control unit (not shown in the drawings) and a control switch (not shown). The occupant can push the control switch and thus the display device is moved from its stored position to the operational position and vice versa. Also it is possible to adjust the display device such that the display screen is moved just slightly to obtain the optimal position with regard to the occupants' line of viewing.

According to another aspect of the invention each of the mechanism devices comprises a driven slider guided in a guide channel, said driven slider being driven by the drive cable, a locking slider being guided in the guide channel, said locking slider being connected to the driven slider at least in the storage position, a locking lever being connected to the locking slider and biased by a leaf spring as such capable of locking the locking slider to the guide, a display lever being connected, on one end to the locking slider and on another end to the display device for rotating the display device from a substantial horizontal plane towards a substantial vertical plane. The mechanism devices each may comprise a front rotation pin connected to the display device and engaged into the guide channel and further a rear rotation pin connected to the drive cable. With this type of mechanism device it is possible to move the display device from a storage position in which the display device is stored in a substantially horizontal plane towards the operational position, first by moving the display device via the driven slider, moved by the drive cable in a guide channel, in a substantial horizontal plane, in a longitudinally forward direction until the point is reached where the locking lever locks the locking slider in the guide channel to the guide. At this position the front rotation pin and the display lever with its pivotal connection to the locking slider is held in position and does not move further. The drive cable continues to move further in the direction forwardly and via the rear rotation pin the display device follows this movement, however the front rotation pin engaged in the guide channel follows a different path. The guide channel has a sharp bend in a downward direction and at the end of the bend the channel has an exit opening, so the front rotation pin and therewith the lower end of the display device follows this channel path and moves in a downward direction. The opposite end of the display lever is connected somewhere halfway the lateral side of the display device and guides the lower end of the display devices in a curved movement to its lowest position. To reach this position the drive cable is stopped by the control unit. Meanwhile, in this movement the rear rotation pin has allowed the display device to rotate and holds the upper end of the display device in place. The display device has now arrived in its operational position and the device is held in position in a rigid way such that vibrations caused by the road surface when driving the vehicle may not lead to an unreadable vibrating display screen.

According to another aspect, each of the display devices is guided by guides attached to opposite lateral sides of the stationary frame. As such the display device may be a large device which extends in transverse direction across the vehicle interior roughly of the size of the width of the semi-transparent panel. The display device may be used by more than one occupant whereby on one display screen two or more different images are displayed adjacent to each other.

According to another embodiment two display devices are positioned adjacent to each other seen in a transverse direction of the vehicle and can be adjusted independently from each other, wherein each of the display devices is guided by a guide attached to the lateral side of the stationary frame and an opposite central guide positioned substantially in a central plane in the vehicle. In such case each of the display devices is capable of being adjusted individually to the line of view of the occupant viewing it, because each of the display devices is equipped with a control unit and a control switch.

According to another aspect of the invention, the central guide is connected to the stationary frame by means of the front beam and a rear beam and optionally a middle beam. It is required to support the central guide such that it offers a rigid support to each of the display devices. As such in this aspect the semi-transparent panel has two see through areas which are separated by a centre console to cover the central guide from view of the occupants. This centre console may also be used for other purposes, such as providing storage room.

According to another embodiment of the invention, the central guide is attached to a movable display carrier. When it is required to avoid a centre console, a movable display carrier for the display devices is conceivable. The central guide can be mounted on this movable display carrier and the carrier may be moved in a longitudinal direction such that central guide is moved into a position by means of a separate drive system in which the display device is able to be moved from the storage position towards the operational position in the same way as described above.

According to yet another embodiment the display devices are positioned adjacent to each other seen in a longitudinal direction and whereby the display screen of each of the display devices is pointing in an opposite direction. It is conceivable that an interior of a vehicle is used in such a way that the occupants not only are seated adjacent to each other in lateral direction of the vehicle, but also opposite to each other and facing each other in longitudinal direction. The display devices, for those occupants seated with their faces pointing towards the longitudinal front end of the vehicle, the storage and operational positions of which are as per description of above. However when the occupants are faced towards the longitudinal rear of the vehicle, the storage and operational positions of the display devices are in an opposite sense, meaning that the storage positions of the display devices lie longitudinally seen in front of the operational position.

In yet another aspect of the invention, the at least one semi-transparent panel can be covered from the interior side by a sunscreen to avoid light coming through, independently from the position of the display device. Such a sunscreen may be a rollo device having a flexible cloth or may be a rigid panel such as a sunshade. All of the functionalities of the sunscreen can be used as well as the functionalities of the roof construction, which may be a fixed panel roof construction or an openable panel roof construction.

An aspect of the invention is a roof construction for a vehicle that includes at least one panel fitted in an opening in the fixed roof of the vehicle. The at least one semi-transparent panel is connected to a stationary frame. At least one display device is capable of showing images from its display screen to occupants in the vehicle. A drive system moves the display screen of the display device at least into a substantially horizontal storage position, and into an operational position in which the display screen is visible for occupants in an interior space of the vehicle. The stationary frame comprises longitudinal guide rails for the display screen to enable the drive system to move the display screen into its storage position at ends of the guide rails, such that after mounting the roof construction into the vehicle, the display screen will be covered in its storage position from below by a headliner of the vehicle.

All features claimed in relation to the vehicle are also applicable to the roof construction.

BRIEF DESCRIPTION OF THE DRAWINGS

Aspects of the invention will be further explained with reference to the drawings showing exemplary embodiments of the roof construction and vehicle.

FIGS. 3A-3C show schematic perspective views of the roof construction in 3 different positions of the display device.

FIGS. 4A-4D show schematic side views of the vehicle roof and roof construction illustrating 4 different positions of the display device.

FIGS. 5A-5B show perspective views of the mechanism device on one side of the display device.

FIG. 6 shows a cross section along line VI-VI in FIG. 4D.

FIG. 7 shows a cross section along line VII-VII in FIG. 6

FIG. 8 shows a cross section along line VIII-VIII in FIG. 4D

FIG. 9 shows a schematic side view of a vehicle roof and an embodiment of the roof construction including a movable carrier for the display devices.

FIG. 10 shows a schematic plan view of the embodiment of the roof construction of FIG. 9.

DETAILED DESCRIPTION OF THE ILLUSTRATIVE EMBODIMENTS

Figure 1:
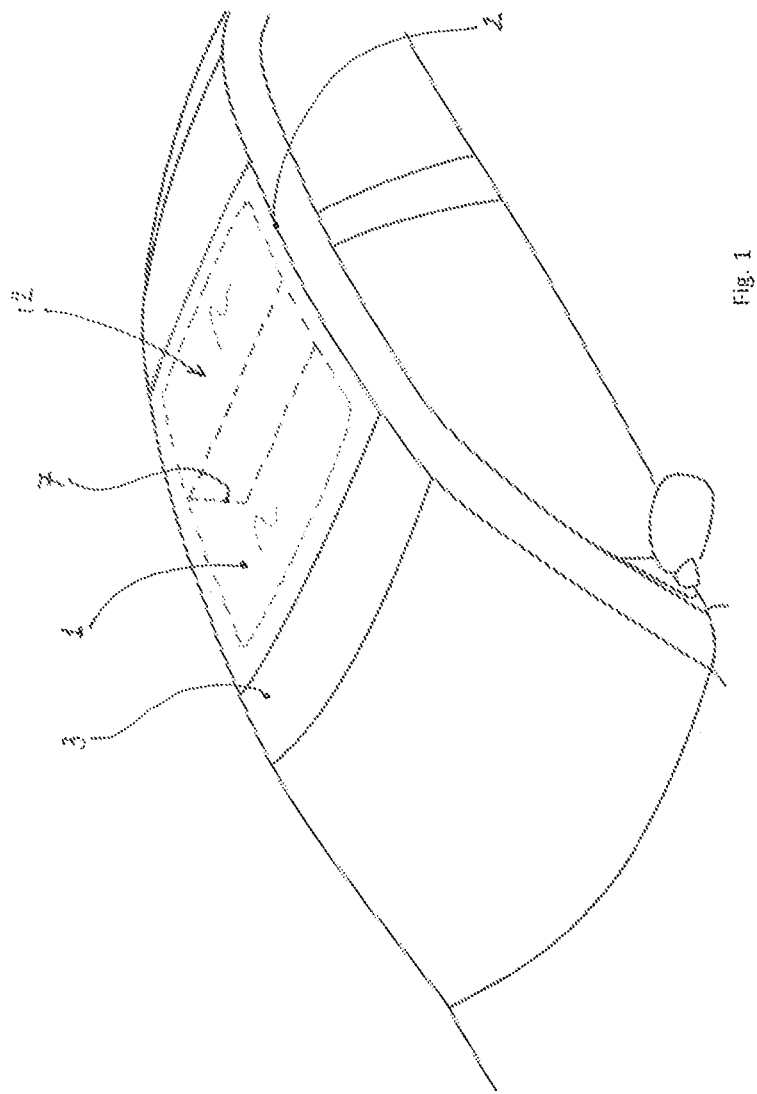
FIG. 1 shows a perspective partial view of a vehicle with a roof construction.

FIG. 1 illustrates a vehicle, in this case a passenger car, having a fixed roof 3 and therein an opening 2 which is covered by a roof construction. The roof construction of FIG. 1 includes a, preferably, semi-transparent panel 1. FIG. 1 shows a fixed panel, however the roof construction may also be equipped with one or more movable panels or with a combination of a fixed panel in the rear and a movable panel in the front of the roof opening 2. Further a display device 7 is illustrated which is shown in an operational position 11. The operational position 11 of the display device 7 is the position in which the occupant has the optimum line of view on the display screen 8 of the display device. In FIG. 1 a display device 7 is shown for the rear occupants. It is conceivable that the display device 7 is available for one or both occupants in the front of the vehicle.

Figure 2:
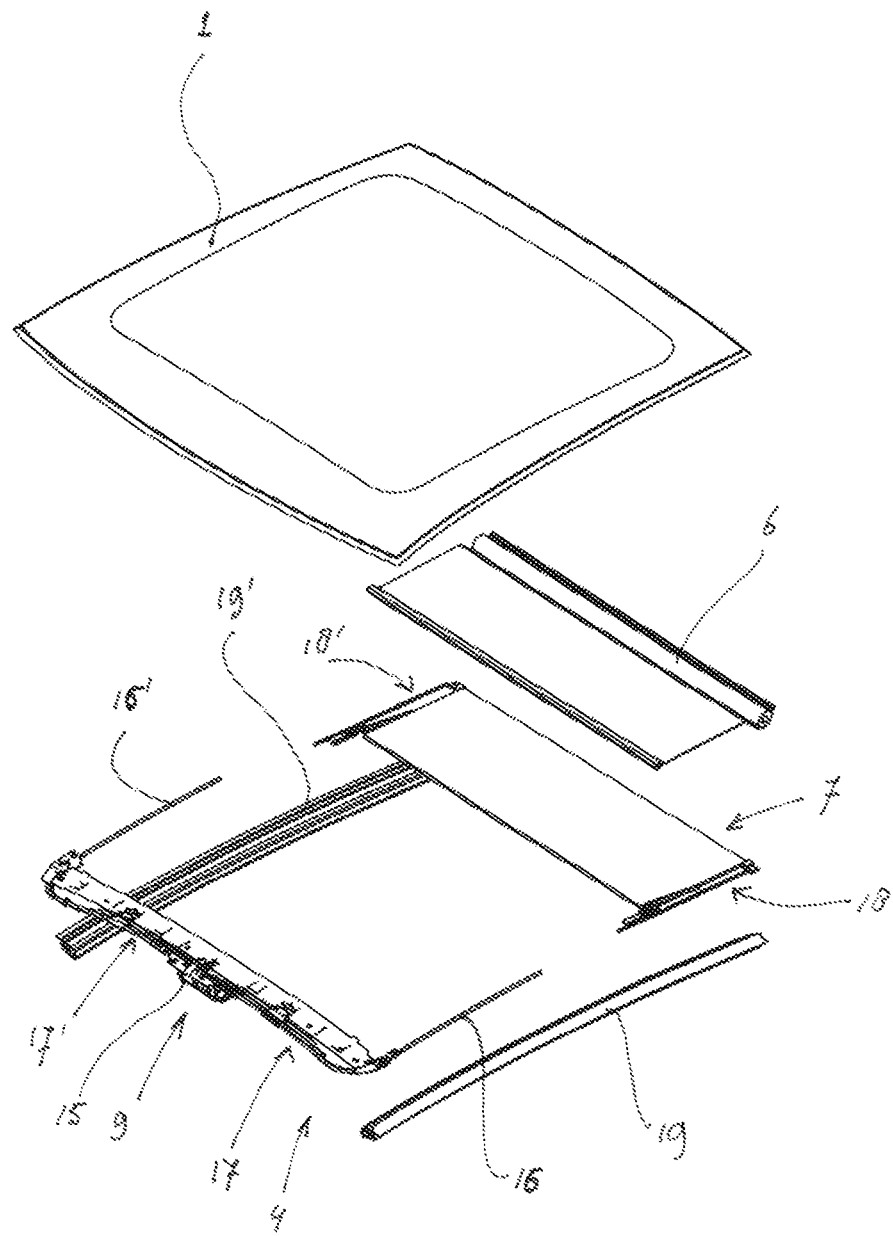
FIG. 2 shows an exploded view of the roof construction.

FIG. 2 shows an exploded view of the roof construction showing the semi-transparent panel 1, here a fixed panel, a sunscreen 6, here a rollable (rollo) flexible sunscreen is shown, a display device 7 and attached to it a mechanism device 18, 18' and further a pair of drive cables 16, 16' and an electric drive motor 15 fixed to a front beam of a stationary frame 4. The stationary frame 4 further comprises a pair of guides 19, 19' extending in longitudinal direction. As can be seen from the drawing, the guides 19, 19', drive cable tubes 17, 17', the mechanism devices 18, 18' and the detailed parts of it are placed on each lateral edge of the stationary frame 4 and each of these respective left and right parts are shaped mirror imaged. Each of these parts is numbered with the mirror imaged part number given an quotation mark.

In FIG. 3A it is shown that the display device 7 is positioned in its storage position 10 at the longitudinal rear end of the stationary frame 4 in a substantially horizontal plane. The stationary frame 4 may extend substantially horizontally, which means, for instance as is shown in FIG. 4A, that the guides 19, 19' extend in a curved manner with a large radius, whereby a line connecting the front end and the rear end of the guides 19, 19', will extend approximately in a horizontal plane. The curvature and the vertical position of the front end and rear end of the guides 19, 19' relative to each other in the stationary frame 4 may vary depending on the shape of the vehicle. However it is anticipated within this definition of substantially horizontal that a line through the front end and the rear end of the guides 19, 19' measured in the vehicle grid will lie within an angle of plus or minus 15 degrees with an exactly horizontal plane. The guides 19, 19' will extend in rearward direction to such extent that it allows the display device 7 to lie in its storage position substantially completely above a headliner 13, which is described further below.

In FIG. 3B the display device 7 is shown in a longitudinal forward position while being still in a substantially horizontal plane. And in FIG. 3C the display device 7 is shown in an operational position 11 in which occupants (in this case in the rear seats of the vehicle) can observe the display screen 8 and be able to see images on the display screen 8. The display device 7 slides from its storage position 10 in a substantially horizontal direction and in a substantially horizontal position along the guides 19, 19' of the stationary frame 4 in a forward direction. The display device 7 is then moved in a pivotal manner, with its front end part in a downward direction, until the display device 7 arrives in its operational position 11, which is more or less vertical.

Figure 4B:
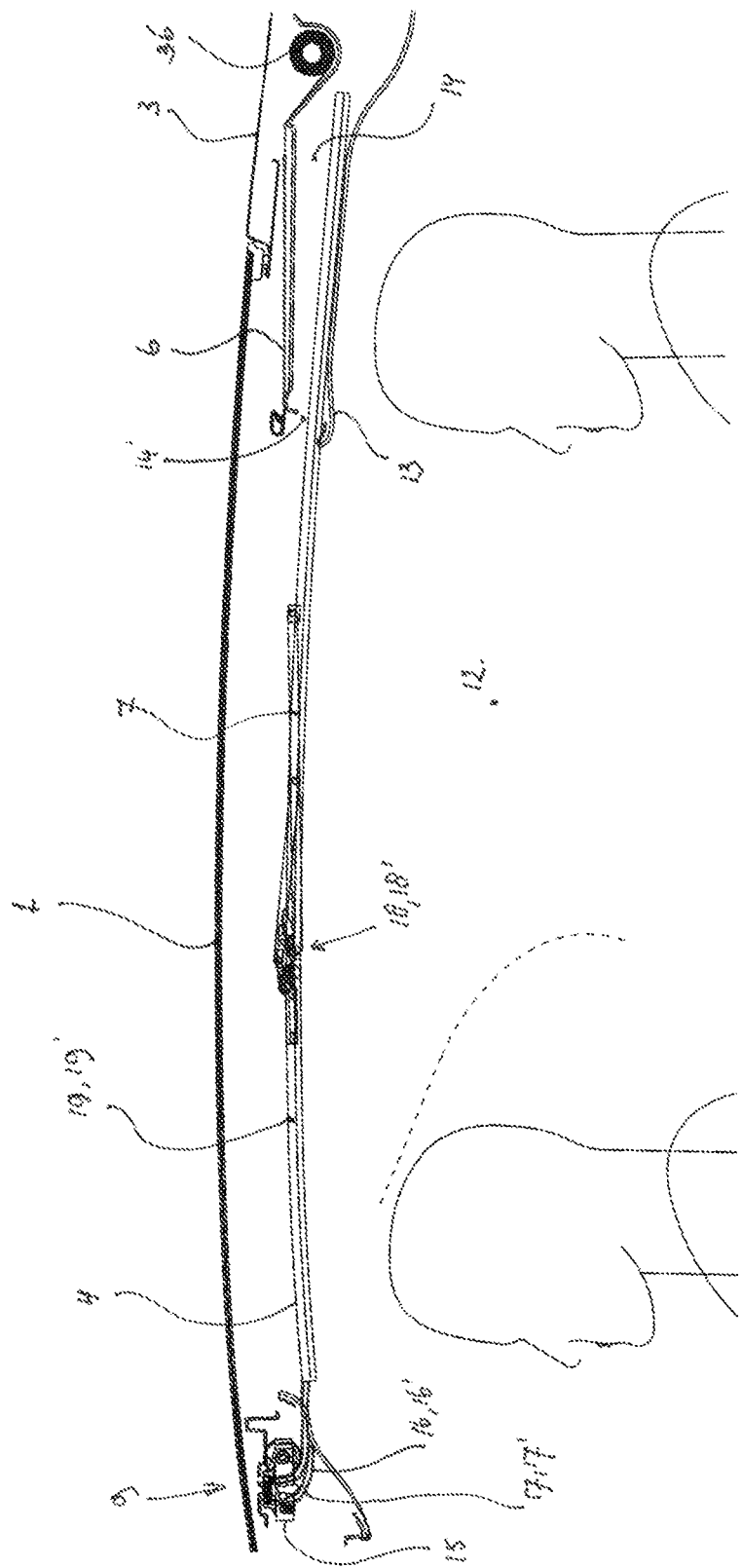
Figure 4C:
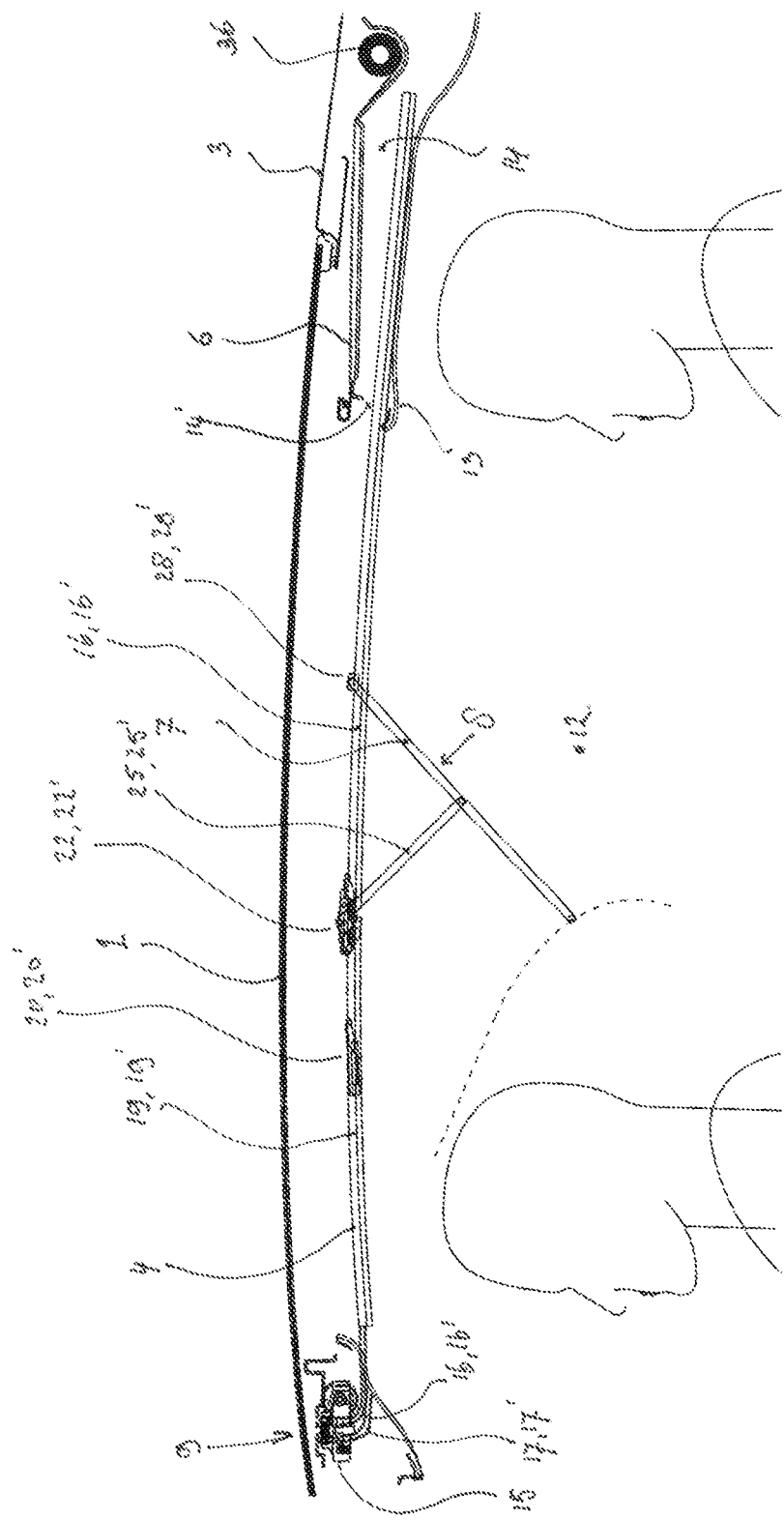
Figure 4D:
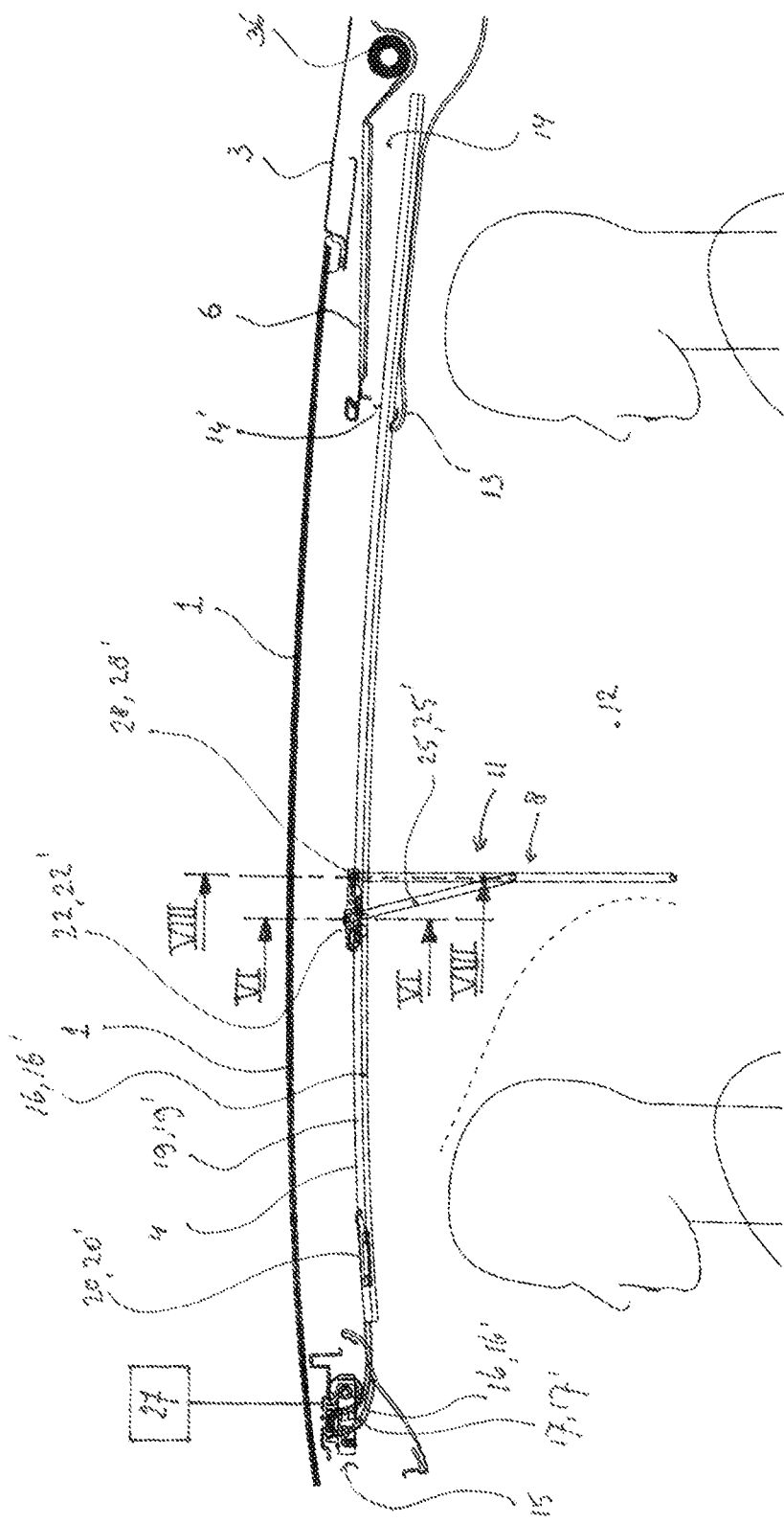

In FIG. 4A, 4B and FIG. 4D the display device 7 is drawn in a side view in the same positions as described above for FIGS. 3A, 3B and 3C. In FIG. 4C an intermediate pivotal position of the display device 7 is added.

In FIG. 4A the display device 7 is drawn in its storage position 10 behind/above a headliner 13. The headliner 13 is an interior cover part that covers the fixed roof 3, and in this case also the frame 4, on the interior side of the vehicle at least in the area that surrounds the semi-transparent panels 1. The headliner 13 in general has a (semi)rigid shell which may be covered on its visible lower side with any material. The headliner can be attached to the fixed roof and/or to the stationary frame 4 (in FIGS. 6 and 8 it is shown that a clip 35 is hooked to the guide 19, 19'). A cavity 14 is formed the lower side by the headliner 13 and on the upper side by the sunscreen 6, or in this case by a cassette containing a winding shaft 36 and the sunscreen 6 in its non-extended condition. The cavity 14 is big enough to store substantially the complete display device 7 (the parts of mechanism device 18, 18' protruding in FIG. 4A will be above or within guide 19, 19'). Furthermore a rectangular opening 14' (FIG. 4B—4D) between an edge of the headliner 13 and the sunscreen 6, which is positioned above the display device 7, is formed to enable the display device 7 to slide into and out of its storage position 10 within the cavity 14. This opening 14' of the cavity 14 may be closable or remain open. Due to the small thickness of modern display devices 7 the opening 14' may have a very small height.

In FIG. 4B the display device 7 is shown in a position forward of the storage position 10. The display device 7 is connected to the guides 19, 19' by means of a mechanism device 18, 18'. The guides 19, 19' extend in longitudinal direction and form part of the stationary frame 4. The display device 7 is moved from its storage position forward in a substantial horizontal plane along the guides 19, 19' by means of a drive system 9. The display device 7 moves from its storage position 10 along the guides 19, 19' up to the position of FIG. 4B. In this position, the mechanism device 18, 18' locks a part of the mechanism 18, 18' to the guide 19, 19'. This means that part of the mechanism device 18, 18' is stopped but another part of the mechanism device 18, 18' continues to move under the driving force of the drive system 9. The display device 7 gradually rotates and moves downwardly, as can be seen in FIG. 4C towards the substantially vertical operational position 11 in FIG. 4D. The downward movement of the display device 7, as can be seen from a comparison of FIGS. 4C and D, is made such that the display device 7 is not entering the facial area of the occupant and neither protrudes into the area of the headrest of the seat in front of the occupant.

It may also be conceivable that the drive motor 15 is controlled by a control unit 27 which unit comprises an anti-trap system with which pinches or collisions are detected occurring between the display device 7 and/or the mechanism device 18, 18' and other objects in the interior space 12 of the vehicle, in order to prevent injuries to occupants. The control unit 27 may detect a collision/pinch situation and, based on this, will reverse or stop the movement of the display device 7.

In FIGS. 5A and 5B a part of the display device 7 and the mechanism device 18, 18' is shown from two viewing sides. The display device 7 is drawn in the operational position 11 in both FIGS. 5A and 5B. For clarity, the guides 19, 19' have been omitted to get a better view of the detailed parts of the mechanism device 18, 18'. In both Figs. a part of the drive cables 16, 16' coming from the front of the stationary frame 4 and being guided in a channel 21, 21' of the guides 19,19' (not shown here, but in FIGS. 7 and 8) is shown at the left hand side of the drawing. This part of the drive cables 16, 16' is attached to a driven slider 20, 20'. Between the driven slider 20, 20' and the connection to the display device 7 a second piece of the drive cables 16, 16' is shown, which is guided like the first piece of the drive cables 16, 16' in the channel 21, 21' of the guides 19, 19', and connecting the driven slider 20, 20' to a rear rotation pin 28, 28' which is positioned on the lateral side of the display device 7. A display lever 25, 25' extends from approximately halfway the lateral side of the display device 7 to the locking slider 22, 22'. The display lever 25, 25' is pivotally connected to the display device 7 and pivotally connected to the locking slider 22, 22'. The locking slider 22, 22' in this operational position 11 of the display device 7 is locked to the guide channel 21, 21'. This firm connection is made by a part of the locking slider 22, 22' which is a locking lever 23, 23'. The locking lever 23, 23' is pivotally connected to the locking slider 22, 22' and is biased by a leaf spring 24, 24' (FIG. 7), such that the locking lever 23, 23' tends to be pushed in a downward direction. In the operational position 11 of the display device 7 the locking lever 23, 23' locks the locking slider 22, 22' in the guide 19, 19' in that the locking lever 23, 23' protrudes into a hole in the flange of the channel 21, 21' in the guide 19, 19'. So the locking lever 23, 23' and therewith the locking slider 22, 22' are locked to the guide 19, 19' and form the rotation axis for the display lever 25, 25'.

The construction of the locking slider 22, 22' and locking lever 23, 23' is further explained with the help of FIGS. 6 and 7. In FIG. 6, the display device 7 is shown in the operational position. Adjacent to it the display lever 25, 25' extends from its pivotal connection to the locking slider 22, 22'. Just in the centre of the locking slider 22, 22' the locking lever 23, 23' is shown with the nose of the locking lever 23, 23' protruding through a hole in the guides 19, 19'. The locking slider 22, 22' is slidably mounted in the channel 21, 21' in the guides 19, 19'. In this section also the drive cables 16, 16' are shown in its drive cable section of guide channel 21, 21'.

In FIG. 7 the locking slider 22, 22' is shown in more detail on the right side of FIG. 7. The locking lever 23, 23' rotates around a locking lever pivot and the leaf spring 24, 24' is shown biasing the locking lever 23, 23' from above in a downward direction. Also here, it is clearly shown that the locking lever nose protrudes through a locking lever hole in the guide channel 21, 21'. To the left side, the driven slider 20, 20' is shown. In case the display device 7 is moved from its operational position 11 to the stored position 10 the drive cables 16, 16' (not shown in FIG. 7) will move towards the rear of the vehicle, in FIG. 7 towards the right side. The driven slider 20, 20' connected to the drive cables 16, 16' will move to the right side too and eventually be engaged with the locking slider 22, 22'. The protruding part of the driven slider 20, 20' will move into the locking slider 22, 22' and will move the locking lever 23, 23' upwards against the biasing force of the leaf spring 24, 24'. As such the nose of the locking lever 23, 23' will be lifted out of the locking lever hole in the guide 19, 19'. With the locking lever nose lifted out of the hole in upward direction, the locking slider 22, 22' is unlocked from the guide 19, 19' and is moved along the channel 21, 21' in the guide 19, 19' together with the driven slider 20, 20' in a rearward movement to the storage position 10 of the display unit 7.

In FIG. 8 a section along line VIII-VIII in FIG. 4D is shown. The section shows the rear rotation pin 28, 28' attached to the lateral side of the display device 7 and its connection to the drive cable 16, 16'. Also here is shown the electrical connection of the display device 7 with the electrical installation of the vehicle. This connection is made by means of a so called flat cable 34. The flat cable extends in the guide channel 21, 21' from the display device 7 to a position rearward of the operational position 11 of the display device 7 where the flat cable 34 is connected to the electrical installation of the vehicle. The flat cable 34 may follow the movements of the display device 7 by folding itself along the length of the distance between the momentary position of the display device 7 and the fixed position of the connection with the electrical installation of the vehicle.

Figure 11:
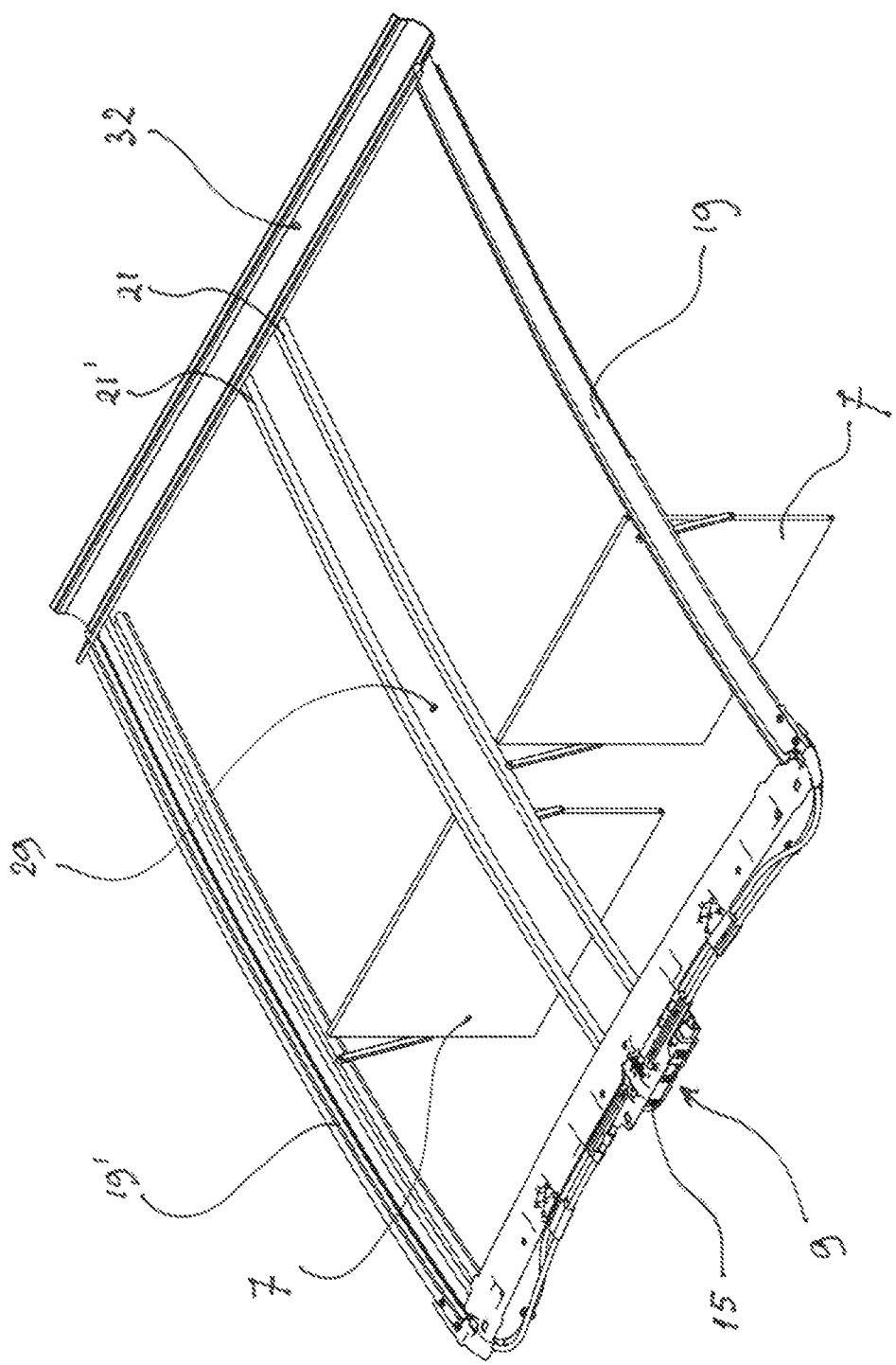
FIG. 11 shows an schematic perspective view of an embodiment of the roof construction having a central guide.

In FIGS. 9, 10 and 11 two other embodiments are shown. These embodiments may be advantageous in case instead of one display device 7 two or more display devices are placed adjacent to each other seen in a transverse direction. In case for instance two display devices 7 are placed adjacent to each other, one for each occupant, each of the display devices 7 needs to able to be adjusted independently to the optimal line of view of the occupant. This would be difficult with the system described above having a guide with a mechanism 18, 18' on each lateral side of the stationary frame 4.

Instead in the earlier embodiment, a central guide 29 is now proposed which extends in longitudinal direction in the centre of the vehicle.

In the embodiment of FIG. 11 this central guide 29 is a stationary guide having multiple channels 21, 21' for the guidance of the drive cables 16, 16' and the mechanism devices 18, 18' (not shown) that are required for the driving guidance of the display device 7 from the left and right centre area sides, whereas for the lateral left and right outboard sides the above described guides 19, 19' mounted on the stationary frame 4 and mechanism devices 18, 18' can be used. The central guide 29 in this case is attached to the front beam and a rear beam 32 of frame 4. There may also be provided a middle beam for support of the centre guide 29.

To avoid that the central guide 29 block the vision towards the exterior through the semi-transparent panels 1 or block a part of the light coming in through the panels 1, the central guide 29 in the embodiment of FIGS. 9 and 10 is placed on a display carrier 33. When the display device 7 is in its operational position 11, the display carrier 33 is moved in its forward position. When the display device 7 should be moved to its stored position, the display device(s) 7 is/are first pivoted to their substantially horizontal position in which it lies flat against the lower side of the display carrier 33 and then the display carrier 33 together with the display devices 7 is moved rearwardly above the headliner 13. As such when the display devices 7 are not used, the display carrier 33 is not obstructing the view through the panel 1, nor obstructing the light entering through the panel 1. The display carrier 33 may be provided with its own drive mechanisms to independently pivot the display devices 7, whereas the drive motor 15 and drive cables 16. 16' may be used to slide the display carrier 33. The display carrier 33 will then have also have channels 21, 21' on the outboard sides. Other mechanisms for driving the display devices 7 and display carrier 33 are conceivable.

Figure 12:
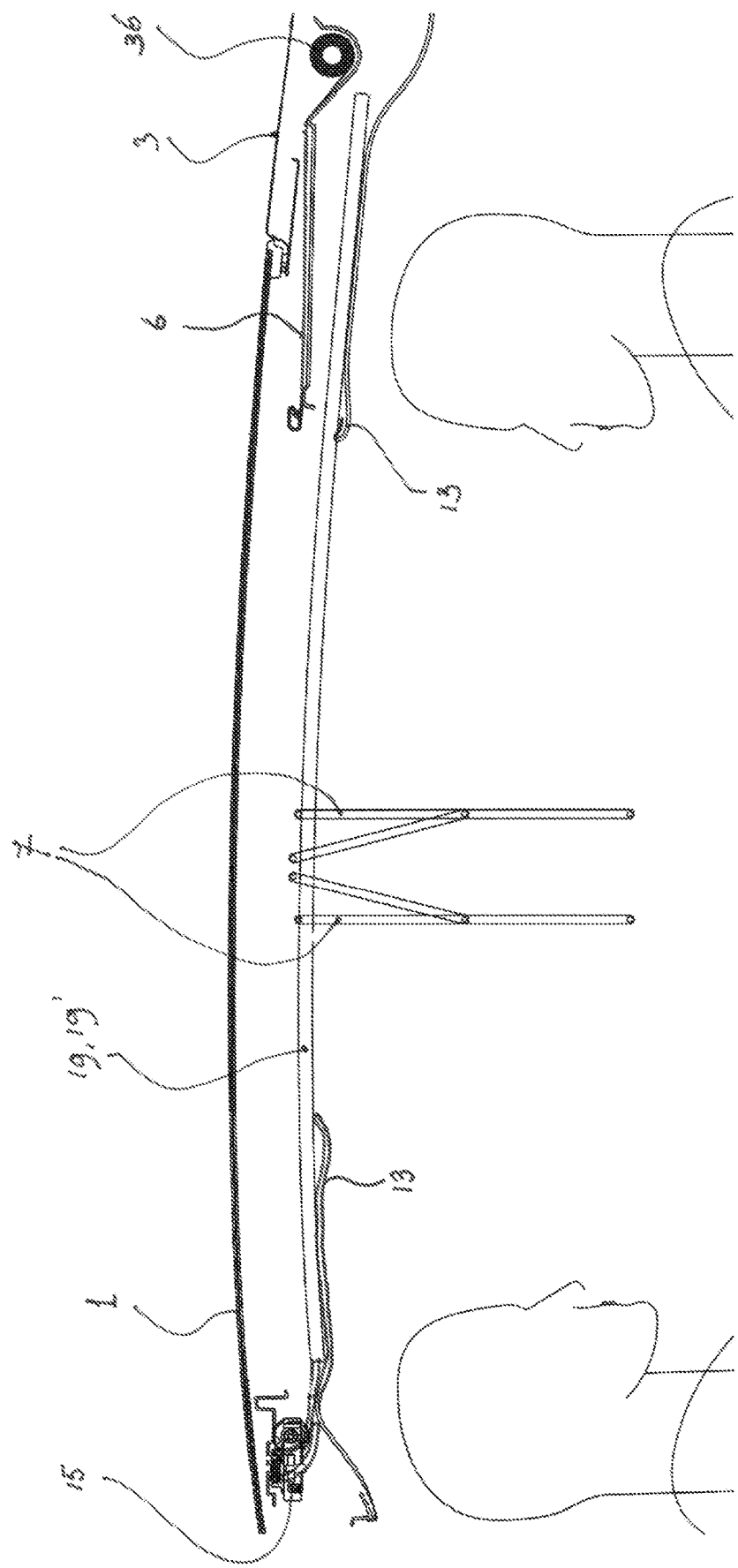
FIG. 12 shows a schematic side view of a vehicle roof and an embodiment of the roof construction having multiple display devices which are placed oppositely towards each other.

In FIG. 12 an embodiment is shown whereby the occupants not only are seated adjacent to each other facing a longitudinal forward direction but are also seated opposite to each other and thus facing each other. The display devices 7 of the occupants facing rearwards may be stored in a similar way behind a front portion of the headliner 13 and each of these display devices 7 may be moved into an operational position 11 in a mirror imaged way compared to the moving operation of the display devices 7 for the occupants facing a forward direction.

The invention is not limited to the examples described above and shown in the drawings and may be varied in different other ways. For instance the motor 15 is drawn at the front transverse end of the stationary frame 4, however alternatively the motor 15 may be placed at the rearward transverse side of the stationary frame 4. The sun screen 6 in the drawings is a rollable flexible sunscreen but can also be some type of rigid sunshade or can be a darkening layer incorporated into a so called switchable panel 1. The display devices 7 can be of any type available on the market, including for example a display device consisting of a separate (stationary) image projector and movable display screen.

What is claimed is:

1. A vehicle having a roof construction in a fixed roof, comprising:
    a stationary frame;
    at least one semi-transparent panel connected to the stationary frame and fitted in an opening in the fixed roof of the vehicle;
    a headliner on an interior side of the fixed roof is configured to hide the fixed roof and stationary frame from view;
    a display device includes a display screen configured to show images to occupants in the vehicle; and
    a drive system comprising at least one drive motor, capable of driving at least one pair of flexible drive cables, said drive cables being guided in at least a pair of guide tubes, said drive cables being connected to at least a pair of mechanism devices, slidably guided to at least one pair of guides and attached to the display device, said at least one pair of guides being attached to the stationary frame,
    wherein the drive system is configured to move the display screen of the display device at least into a storage position, and into an operational position in which the display screen is visible to occupants in an interior space of the vehicle, wherein the display screen of the display device, in the storage position, is moved into a cavity above the headliner and is thus hidden from view and protected by the headliner.

2. The vehicle according to claim 1, wherein the headliner surrounds a circumventing edge of the at least one semi-transparent panel and leaves an opening to enable the display device to enter and exit the cavity.

3. The vehicle according to claim 1, wherein, to establish the operational position, the display device is moved by the drive system out of the storage position in a substantially horizontal plane and is then rotated around a substantially horizontal axis into the operational position whereby a leading end of the display device moves from the substantially horizontal plane downwardly and a trailing end of the display device substantially stays in the substantially horizontal plane.

4. The vehicle according to claim 3, wherein each of the mechanism devices comprises a driven slider guided in a guide channel, said driven slider being driven by the drive cables.

5. The vehicle according to claim 4, wherein each of the mechanism devices further comprises a locking slider guided in the guide channel, said locking slider being connected to the driven slider at least in the storage position, a locking lever being connected to the locking slider and biased by a leaf spring capable of locking the locking slider to the guide channel.

6. The vehicle according to claim 5, wherein each of the mechanism devices further comprises a display lever connected on one end to the locking slider and on another end to the display device for rotating the display device from the substantial horizontal plane towards a substantial vertical plane.

7. The vehicle according to claim 6, wherein each of the mechanism devices further comprises a front rotation pin connected to the display device and engaged into the guide channel and further a rear rotation pin connected to the drive cable.

8. The vehicle according to claim 3, wherein the display device is guided by guides attached to opposite lateral sides of the stationary frame.

9. The vehicle according to claim 1, wherein two display devices are positioned adjacent to each other seen in a transverse direction of the vehicle and can be adjusted independently from each other.

10. The vehicle according to claim 9, wherein each of the display devices is guided by a guide at a lateral side of the stationary frame and an opposite central guide positioned substantially in a central plane of the vehicle.

11. The vehicle according to claim 10, and further comprising a front beam and a rear beam connecting the central guide to the stationary frame.

12. The vehicle according to claim 9, wherein the display devices are positioned adjacent to each other seen in a longitudinal direction and whereby the display screens of each of the display devices is pointing in an opposite direction.

13. The vehicle according to claim 1, and further comprising a sunscreen configured to cover the panel and block light from an interior side, independently from a position of the display device.

14. The vehicle according to claim 13 wherein the sunscreen is in a form of a rollo screen which is rolled-on or -off from a winding shaft which is positioned above the cavity for the display device.

15. The vehicle according to claim 10, wherein the central guide is attached to a movable display carrier.

16. A roof construction for a vehicle having a fixed roof, comprising:
    a stationary frame;

at least one semi-transparent panel connected to the stationary frame and fitted in an opening in the fixed roof of the vehicle;

at least one display device having a display screen configured to show images to occupants in the vehicle; and a drive system comprising at least one drive motor, capable of driving at least one pair of flexible drive cables, said drive cables being guided in at least a pair of guide tubes, said drive cables being connected to at least a pair of mechanism devices, slidably guided to at least one pair of guides and attached to the display device, said at least one pair of guides being attached to the stationary frame, wherein the drive system is configured to move the display screen of the display device at least into a substantially horizontal storage position, and into an operational position in which the display screen is visible for occupants in an interior space of the vehicle, and wherein the pair of guides enable the drive system to move the display screen into the storage position at ends of the guides, such that after mounting the roof construction into the vehicle, the display screen is covered in the storage position from below by a headliner of the vehicle.

17. The roof construction according to claim 16, wherein each of the mechanism devices comprises a driven slider guided in a guide channel, said driven slider being driven by the drive cables.

18. The roof construction according to claim 17, wherein each of the mechanism devices further comprises a locking slider guided in the guide channel, said locking slider being connected to the driven slider at least in the storage position, a locking lever being connected to the locking slider and biased by a leaf spring capable of locking the locking slider to the guide channel.

19. The roof construction according to claim 18, wherein, to establish the operational position, the display device is moved by the drive system out of the storage position in a substantially horizontal plane and is then rotated around a substantially horizontal axis into the operational position whereby a leading end of the display device moves from the substantially horizontal plane downwardly and a trailing end of the display device substantially stays in the substantially horizontal plane, and wherein each of the mechanism devices further comprises a display lever connected on one end to the locking slider and on another end to the display device for rotating the display device from the substantial horizontal plane towards a substantial vertical plane.

20. The roof construction according to claim 19, wherein each of the mechanism devices further comprises a front rotation pin connected to the display device and engaged into the guide channel and further a rear rotation pin connected to the drive cable.

* * * * *

UNITED STATES PATENT AND TRADEMARK OFFICE
CERTIFICATE OF CORRECTION

| | |
|---|---|
| PATENT NO. | : 11,673,513 B2 |
| APPLICATION NO. | : 17/135039 |
| DATED | : June 13, 2023 |
| INVENTOR(S) | : Sergej Sergeevic Lojko, Thomas Anton Martijnszoon Albers and Suyanto Teri Wahiyu Ten-Jet-Foei |

It is certified that error appears in the above-identified patent and that said Letters Patent is hereby corrected as shown below:

On the Title Page

Item (73) Assignee Name:
Please delete "INALFA ROOF SYSTEMS GROUP B.V"
And insert --INALFA ROOF SYSTEMS GROUP B.V.--

Signed and Sealed this
Eighteenth Day of July, 2023

Katherine Kelly Vidal
*Director of the United States Patent and Trademark Office*